US009319633B1

(12) United States Patent
Birkenes et al.

(10) Patent No.: US 9,319,633 B1
(45) Date of Patent: Apr. 19, 2016

(54) ULTRASONIC ECHO CANCELER-BASED TECHNIQUE TO DETECT PARTICIPANT PRESENCE AT A VIDEO CONFERENCE ENDPOINT

(71) Applicant: Cisco Technology, Inc., San Jose, CA (US)

(72) Inventors: Oystein Birkenes, Oslo (NO); Lennart Burenius, Oslo (NO); Kristian Tangeland, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/662,691

(22) Filed: Mar. 19, 2015

(51) Int. Cl.
H04N 7/14 (2006.01)
H04N 7/15 (2006.01)
H04L 29/06 (2006.01)
G10L 17/22 (2013.01)
G10L 25/21 (2013.01)

(52) U.S. Cl.
CPC *H04N 7/15* (2013.01); *G10L 17/22* (2013.01); *G10L 25/21* (2013.01); *H04L 65/1059* (2013.01); *H04L 65/403* (2013.01)

(58) Field of Classification Search
CPC ........................................................ H04N 7/14
USPC ...................... 348/14.01, 14.08, 14.05, 14.12
See application file for complete search history.

(56) References Cited

U.S. PATENT DOCUMENTS

| | | | |
|---|---|---|---|
| 6,374,145 B1 | 4/2002 | Lignoul | |
| 8,811,119 B2 | 8/2014 | Aarts et al. | |
| 2009/0046538 A1* | 2/2009 | Breed | B60C 11/24 367/93 |
| 2012/0001875 A1 | 1/2012 | Li et al. | |
| 2013/0129102 A1 | 5/2013 | Li et al. | |
| 2014/0368604 A1* | 12/2014 | Lalonde | H04N 7/147 348/14.08 |

OTHER PUBLICATIONS

Tarzia, "Acoustic Sensing of Location and User Presence on Mobile Computers", Technical Report NWU-EECS-11-09, Northwestern University—Electrical Engineering and Computer Science Department, Aug. 31, 2011, 113 pages.
Ricci et al., "Experimental validation of an ultrasound-based measurement system for human motion detection and analysis", Instrumentation and Measurement Technology Conference (I2MTC), 2013 IEEE International , vol., no., pp. 300,305, May 6-9, 2013.
Bloom et al, "Digital Ultrasonic Motion Detector", Teaching Projects in SIPL, http://sipl.technion.ac.il/Info/Teaching_Projects_5-2-09_e.shtml, Sep. 2011, 5 pages.

\* cited by examiner

*Primary Examiner* — Olisa Anwah
(74) *Attorney, Agent, or Firm* — Edell, Shapiro & Finnan, LLC

(57) ABSTRACT

A loudspeaker transmits an ultrasonic signal into a spatial region. A microphone transduces ultrasonic sound, including an echo of the transmitted ultrasonic signal, received from the spatial region into a received ultrasonic signal. A controller transforms the ultrasonic signal and the received ultrasonic signal into respective time-frequency domains that cover respective ultrasound frequency ranges. The controller computes an error signal, representative of an estimate of an echo-free received ultrasonic signal, based on the transformed ultrasonic signal and the transformed received ultrasonic signal. The controller computes power estimates of the error signal over time, and detects a change in people presence in the spatial region based on a change in the power estimates of the error signal over time.

20 Claims, 6 Drawing Sheets

ULTRASONIC ECHO CANCELER-BASED TECHNIQUE TO DETECT PARTICIPANT PRESENCE AT A VIDEO CONFERENCE ENDPOINT

TECHNICAL FIELD

The present disclosure relates to detecting the presence of people using ultrasonic sound.

BACKGROUND

A video conference endpoint includes a camera and a microphone to capture video and audio of a participant in a meeting room, and a display to present video. While no participant is in the meeting room, the endpoint may be placed in a standby or sleep mode to conserve power. In standby, components of the endpoint, such as the camera and display, may be deactivated or turned-off. When a participant initially enters the meeting room, the endpoint remains in standby until the participant manually wakes-up the endpoint using a remote control or other touch device. If the participant is unfamiliar with the endpoint or if the touch device is not readily available, the simple act of manually activating the endpoint may frustrate the participant and diminish his or her experience.

DESCRIPTION OF EXAMPLE EMBODIMENTS

Overview

In accordance with one embodiment, a loudspeaker transmits an ultrasonic signal into a spatial region. A microphone transduces ultrasonic sound, including an echo of the transmitted ultrasonic signal, received from the spatial region into a received ultrasonic signal. A controller transforms the ultrasonic signal and the received ultrasonic signal into respective time-frequency domains that cover respective ultrasound frequency ranges. The controller computes an error signal, representative of an estimate of an echo-free received ultrasonic signal, based on the transformed ultrasonic signal and the transformed received ultrasonic signal. The controller computes power estimates of the error signal over time, and detects a change in people presence in the spatial region over time based on the power estimates of the error signal over time.

Example Embodiments

Figure 1:
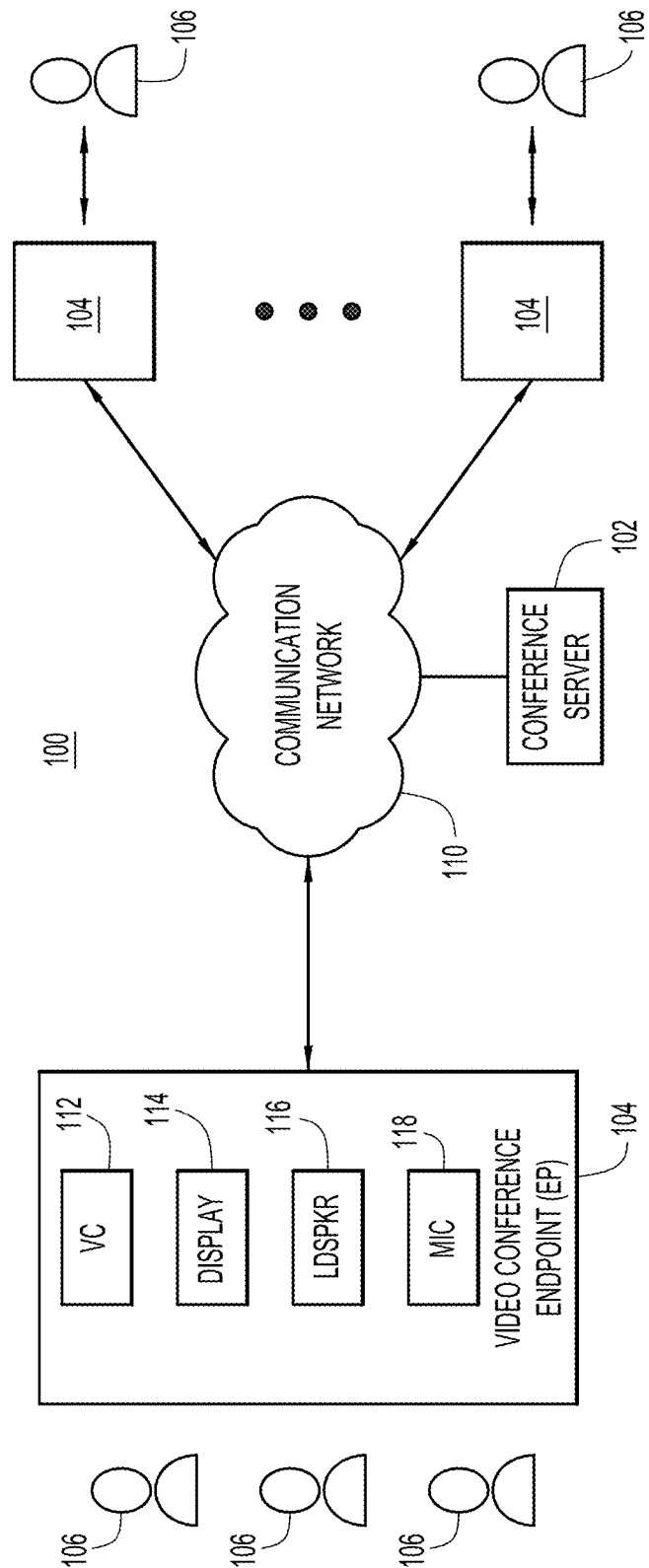
FIG. 1 is a block diagram of a video conference (e.g., teleconference) environment in which embodiments to automatically detect the presence of people proximate a video conference endpoint in a room and selectively wakeup the video conference endpoint or put the endpoint to sleep may be implemented, according to an example embodiment.

With reference to FIG. 1, there is depicted a block diagram of an example video conference (e.g., teleconference) environment 100 in which embodiments to automatically detect the presence of people (i.e., "people presence") proximate a video conference endpoint (EP) and selectively wakeup the endpoint or put the endpoint to sleep may be implemented. Video conference environment 100 includes video conference endpoints 104 operated by local users/participants 106 (also referred to as "people" 106) and configured to establish audio-visual teleconference collaboration sessions with each other over a communication network 110. Communication network 110 may include one or more wide area networks (WANs), such as the Internet, and one or more local area networks (LANs). A conference server 102 may also be deployed to coordinate the routing of audio-video streams among the video conference endpoints.

Each video conference endpoint 104 may include multiple video cameras (VC) 112, a video display 114, a loudspeaker (LDSPKR) 116, and one or more microphones (MIC) 118. Endpoints 104 may be wired or wireless communication devices equipped with the aforementioned components, such as, but not limited to laptop and tablet computers, smartphones, etc. In a transmit direction, endpoints 104 capture audio/video from their local participants 106 with microphone 118/VC 112, encode the captured audio/video into data packets, and transmit the data packets to other endpoints or to the conference server 102. In a receive direction, endpoints 104 decode audio/video from data packets received from the conference server 102 or other endpoints and present the audio/video to their local participants 106 via loudspeaker 116/display 114.

Figure 2:
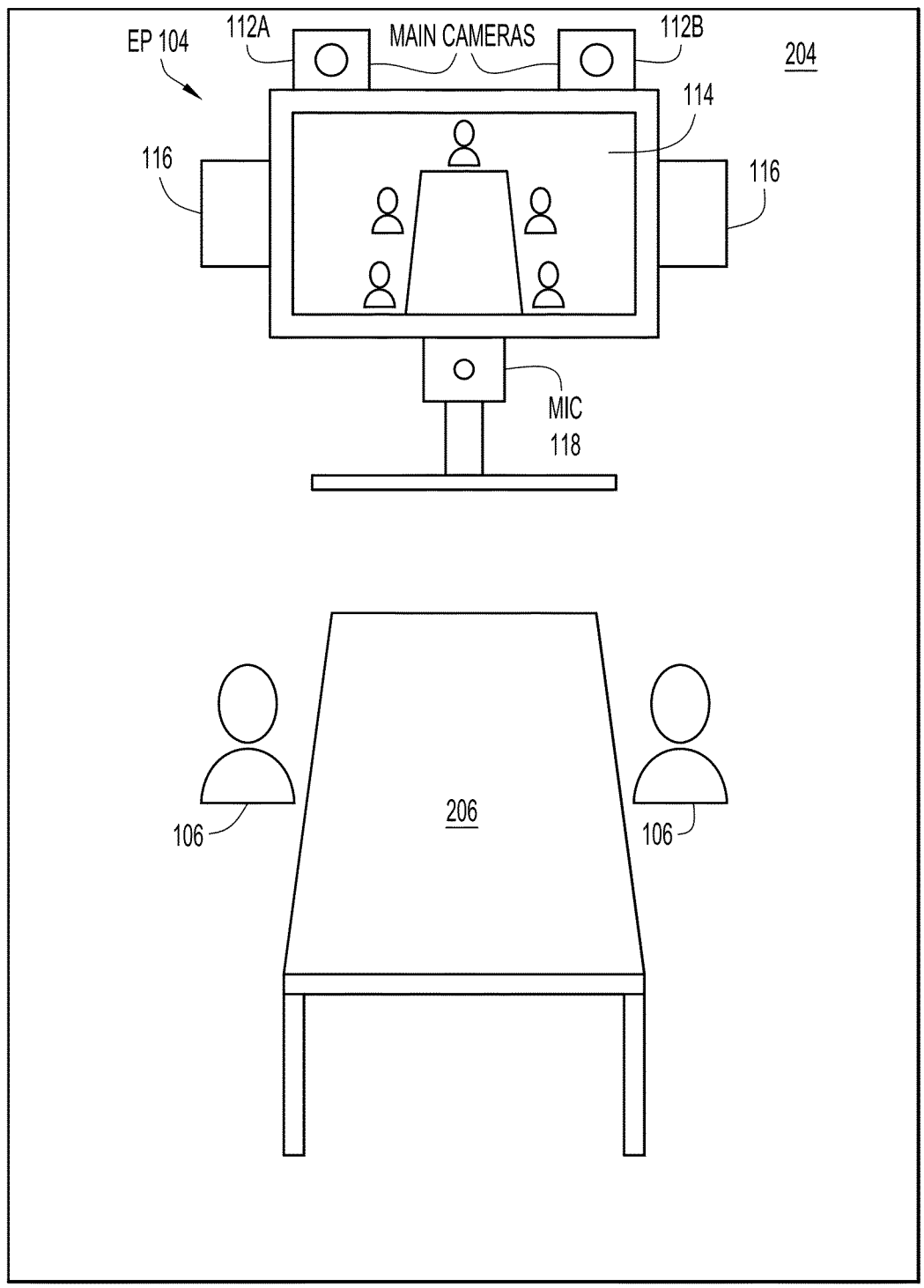
FIG. 2 is an illustration of a video conference endpoint deployed in a room, according to an example embodiment.

Referring now to FIG. 2, there is depicted an illustration of video conference endpoint 104 deployed in a conference room 204 (depicted simplistically as an outline in FIG. 2), according to an embodiment. Video conference endpoint 104 includes video cameras 112A and 112B positioned proximate and centered on display 114. Cameras 112A and 112B (collectively referred to as "cameras 112") are each operated under control of endpoint 104 to capture video of participants 106 seated around a table 206 opposite from or facing (i.e., in front of) the cameras (and display 114). The combination of two center video cameras depicted in FIG. 2 is only one example of many possible camera combinations that may be used, including video cameras spaced-apart from display 114, as would be appreciated by one of ordinary skill in the relevant arts having read the present description. As depicted in the example of FIG. 2, microphone 118 is positioned adjacent to, and centered along, a bottom side of display 114 (i.e., below the display) so as to receive audio from participants 106 in room 204, although other positions for the microphone are possible.

According to embodiments presented herein, video conference endpoint 104 includes an ultrasonic echo canceler to detect whether participants are present (i.e., to detect "people presence") in room 204. Also, endpoint 104 may use people presence detection decisions from the ultrasonic echo canceler to transition the endpoint from sleep to awake or vice versa, as appropriate. The ultrasonic echo canceler is described below in connection with FIG. 4.

Figure 3:
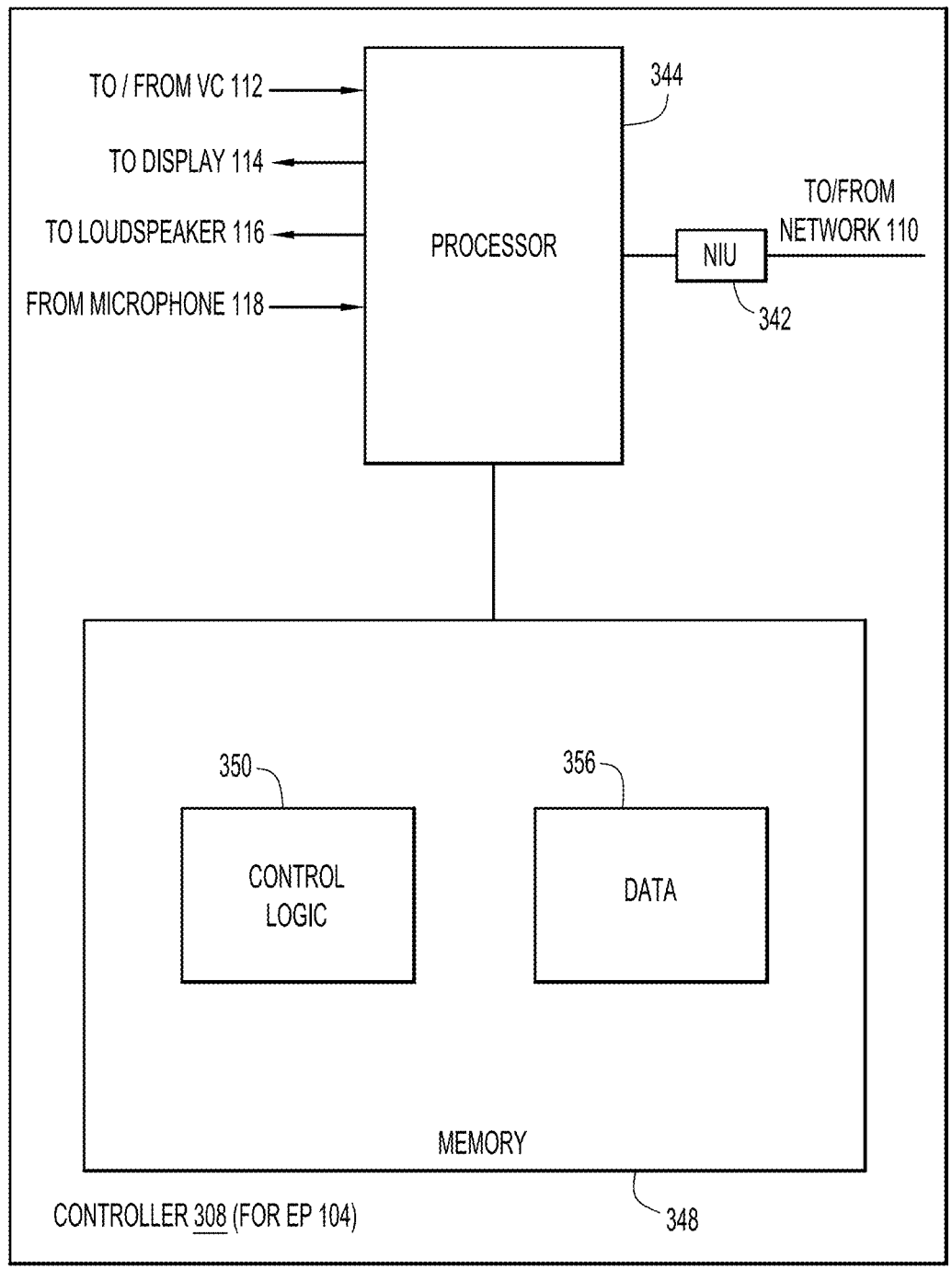
FIG. 3 is a block diagram of a controller of the video conference endpoint, according to an example embodiment.

Reference is now made to FIG. 3, which shows an example block diagram of a controller 308 of video conference endpoint 104 configured to perform techniques described herein. There are numerous possible configurations for controller 308 and FIG. 3 is meant to be an example. Controller 308 includes a network interface unit 342, a processor 344, and memory 348. The network interface (I/F) unit (NIU) 342 is, for example, an Ethernet card or other interface device that allows the controller 308 to communicate over communication network 110. Network I/F unit 342 may include wired and/or wireless connection capability.

Processor 344 may include a collection of microcontrollers and/or microprocessors, for example, each configured to execute respective software instructions stored in the memory 348. The collection of microcontrollers may include, for example: a video controller to receive, send, and process video signals related to display 112 and video cameras 112; an audio processor to receive, send, and process audio signals (in human audible and ultrasonic frequency ranges) related to loudspeaker 116 and microphone array 118; and a high-level controller to provide overall control. Portions of memory 348 (and the instructions therein) may be integrated with processor 344. As used herein, the terms "audio" and "sound" are synonymous and interchangeable.

Processor 344 may send pan, tilt, and zoom commands to video cameras 112 to control the cameras. Processor 344 may also send wakeup (i.e., activate) and sleep (i.e., deactivate) commands to video cameras 112. The camera wakeup command is used to wakeup cameras 112 to a fully powered-on operational state so they can capture video, while the camera sleep command is used to put the cameras to sleep to save power. In the sleep state, portions of cameras 112 are powered-off or deactivated and the cameras are unable to capture video. Processor 344 may similarly send wakeup and sleep commands to display 114 to wakeup the display or put the display to sleep. In another embodiment, processor 344 may selectively wakeup and put to sleep portions of controller 308 while the processor remains active. When any of cameras 112, display 114, and portions of controller 308 are asleep, endpoint 104 is said to be in standby or asleep (i.e., in the sleep mode). Conversely, when all of the components of endpoint 104 are awake and fully operational, endpoint 104 is said to be awake. Operation of the aforementioned components of endpoint 104 in sleep and awake modes, and sleep and wakeup commands that processor 344 may issue to transition the components between the sleep and awake modes are known to those of ordinary skill in the relevant arts.

The memory 348 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 348 may comprise one or more computer readable storage media (e.g., a memory device) encoded with software comprising computer executable instructions and when the software is executed (by the processor 344) it is operable to perform the operations described herein. For example, the memory 348 stores or is encoded with instructions for control logic 350 to perform operations described herein to (i) implement an ultrasonic echo canceler to detect a change in people presence, and (ii) wakeup endpoint 104 or put the endpoint to sleep based on the detected people presence.

In addition, memory 348 stores data/information 356 used and generated by logic 350, including, but not limited to, adaptive filter coefficients, power estimate thresholds indicative of people presence, predetermined timeouts, and current operating modes of the various components of endpoint 104 (e.g., sleep and awake states), as described below.

Figure 4:
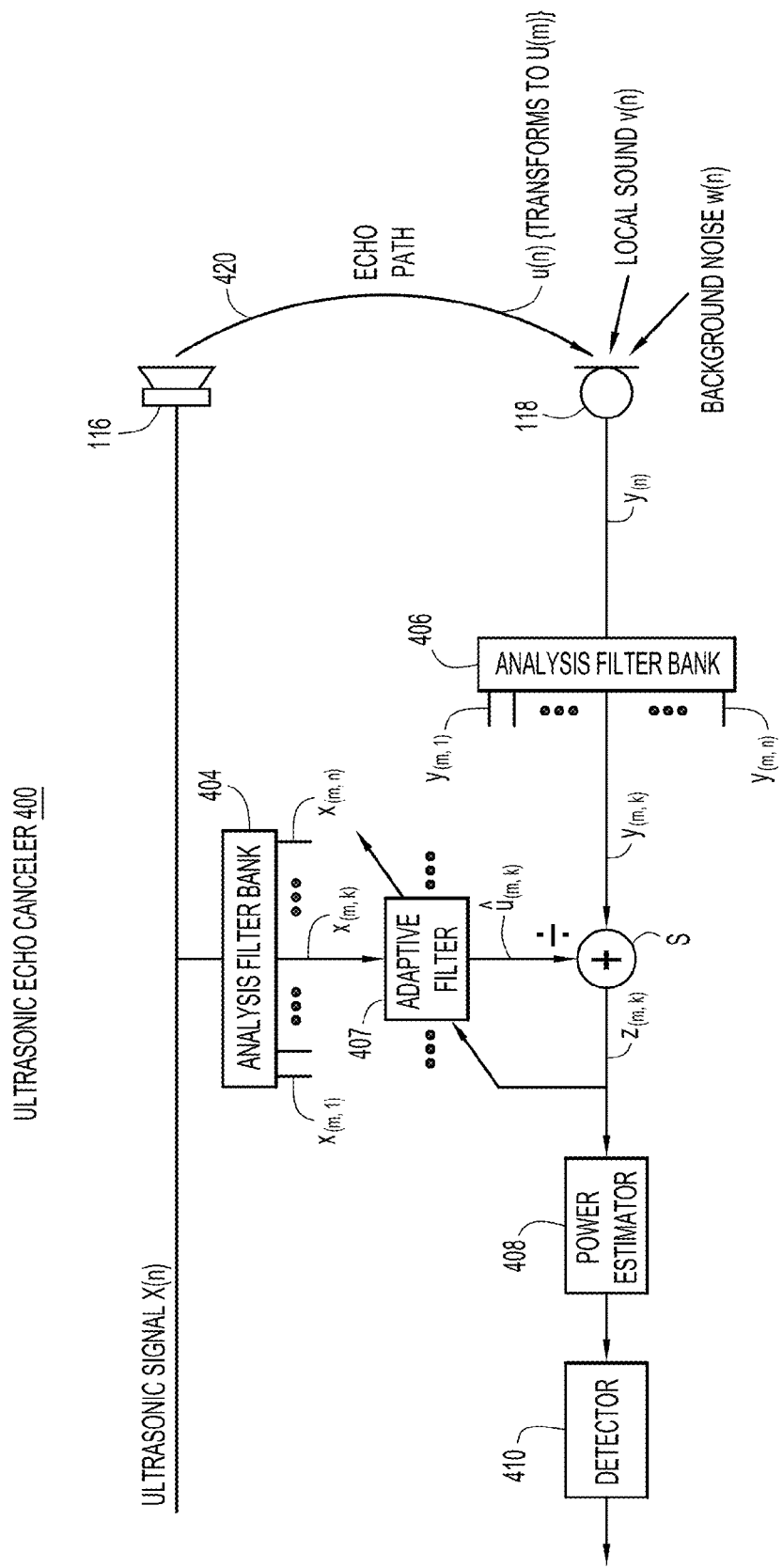
FIG. 4 is a block diagram of an ultrasonic echo canceler implemented in the video conference endpoint to detect whether people are present in a room, according to an example embodiment.

With reference to FIG. 4, there is depicted a block diagram of example ultrasonic echo canceler 400 implemented in endpoint 104 to detect people presence. Ultrasonic echo canceler 400 includes loudspeaker 116, microphone 118, analysis filter banks 404 and 406, a differencer S (i.e. a subtractor S), an adaptive filter 407 associated with adaptive filter coefficients, a power estimator 408, and a people presence detector 410. Analysis filter banks 404 and 406, differencer S, adaptive filter 407, power estimator 408, and detector 410 represent ultrasonic sound signal processing modules that may be implemented in controller 308. As will be described in detail below, ultrasonic echo canceler 400 detects people presence in room 204 (i.e. when people are and are not present in the room), and controller 308 uses the people presence indications to selectively wakeup endpoint 104 when people are present (e.g., have entered the room) or put the endpoint to sleep when people are not present (e.g., have left the room), as indicated by the echo canceler. Echo canceler 104 and controller 308 perform the aforementioned operations automatically, i.e., without manual intervention. Also, echo canceler 104 and controller 308 are operational to perform the operations described herein while endpoint 104 (or components thereof) is both awake and asleep.

Ultrasonic echo canceler 400 operates as follows. Controller 308 generates an ultrasonic signal x(n), where n is a time index that increases with time, and provides the ultrasonic signal x(n) to an input of loudspeaker 116. Loudspeaker 116 transmits ultrasonic signal x(n) into a spatial region (e.g., room 204). Ultrasonic signal x(n) has a frequency in an audio frequency range that is generally beyond the frequency range of human hearing, but which can be transmitted from most loudspeakers and picked up by most microphones. This frequency range is generally accepted as approximately 20 Khz and above, however, embodiments described herein may also operate at frequencies below 20 Khz (e.g., 19 Khz) that most people would not be able to hear. The transmitted ultrasonic signal bounces around in room 204 before it is received and thereby picked up by microphone 118 via an echo path 420. Microphone 118 transduces sound received at the microphone into a microphone signal y(n), comprising ultrasonic echo u(n), local sound v(n), and background noise w(n). Microphone 118 provides microphone signal y(n) to analysis filter bank 406, which transforms the microphone signal y(n) into a time-frequency domain including multiple ultrasonic frequency subbands Y(m,1)-Y(m,N) spanning an ultrasonic frequency range. Also, analysis filter bank 404 transforms ultrasonic signal x(n) into a time-frequency domain including multiple ultrasonic frequency subbands X(m,1)-X(m,N) spanning an ultrasonic frequency range.

In a k'th one of the ultrasonic frequency subbands X(m,k), adaptive filter 407 generates an estimate $\hat{U}(m, k)$ of the subband echo signal U(m,k), where m denotes the time frame index. Differencer S subtracts the echo estimate $\hat{U}(m, k)$ from the subband microphone signal Y(m,k) output by analysis filter bank 406 to form an error (signal) Z(m,k) that is fed back into adaptive filter 407. Adaptive filter coefficients of adaptive filter 407 are adjusted responsive to the fed back error signal. Power estimator 408 computes a running estimate of the mean squared error (power) $E|Z(m, k)|^2$ of the error signal Z(m,k) and detector 410 detects a changing people presence, e.g., when somebody walks into room 204 where nobody has been for a while, based on the mean squared power.

The following is an explanation of how the mean squared error $E|Z(m, k)|^2$ is a good indicator of whether someone enters the room 204. Let $X_k(m)=[X(m,k), X(m-1,k) \ldots$ $X(m-M+1, k)]^T$ denote a delay line for adaptive filter 407, where M denotes the number of adaptive filter coefficients employed in the adaptive filter. Furthermore, let $\hat{H}_k(m)$ denote the vector of the M adaptive filter coefficients. The echo estimate can then be written:

$$\hat{U}(m,k) = X_k^H(m) \hat{H}_k(m) \quad (1)$$

where $(\cdot)^H$ denotes the Hermitian operator. The time-frequency domain transformation of the microphone signal y(n) is given by:

$$Y(m,k) = X_k^H(m) H_k(m) + V(m,k) + W(m,k) \quad (2)$$

where $H_k(m)$ is the unknown optimal linear filter, and where it is assumed that the error introduced by analysis filter bank 406 is negligible. The error is then given by the following equation (3):

$$Z(m,k) = Y(m,k) - \hat{U}(m,k) = X_k^H(m)(H_k(m) - \hat{H}_k(m)) + V(m,k) + W(m,k)$$

and the mean squared error can be written as the following equation (4):

$$E|Z(m,k)|^2$$
$$= (H_k^H(m) - \hat{H}_k^H(m)) R_{X_k}(m)(H_k(m) - \hat{H}_k(m)) + \sigma_V^2(m,k)$$
$$+ \sigma_W^2(m,k)$$

where $R_{X_k}(m) = (EX_k(m) X_k^H(m))$ is the correlation matrix, $\sigma_V^2(m,k) = E|V(m,k)|^2$ and $\sigma_W^2(m,k) = E|W(m,k)|^2$. Assuming x(n) is stationary, the correlation matrix will be constant and independent of m, i.e., $R_{X_k}(m) = R_{X_k}$. Then the following relationship applies:

$$E|Z(m,k)|^2 = \left\| H_k(m) - \hat{H}_k(m) \right\|_{R_{X_k}}^2 + \sigma_V^2(m,k) + \sigma_W^2(m,k) \quad (5)$$

where $\|\cdot\|_A^2$ denotes the A-norm. From equation (5) it is seen that $E|Z(m,k)|^2$ comprises three main terms. The first term is the $R_{X_k}$-norm of the divergence between optimal and estimated filter coefficients, the second term is the power of the local sound signal (v(n)), and the third terms is the power of the background noise (w(n)). It is assumed in the following that the power of the background noise is stationary and time-invariant.

When nobody is in room 204, and nobody has been in the room for a while, the acoustic room impulse response will be approximately static (no change) and adaptive filter 407 will be in a well converged state and provide a good estimate $\hat{U}(m,k)$ of subband echo signal U(m,k). Therefore we have that $$\left\| H_k(m) - \hat{H}_k(m) \right\|_{R_{X_k}}^2$$

is approximately equal to 0. Moreover, there are no or minimal local sounds coming from within room 204 (i.e., $\sigma_V^2(m,k) = 0$) except from the ultrasonic background noise $\sigma_W^2(m,k)$. Thus the mean squared error $E|Z(m,k)|^2$ will be small comprising small residual echo and background noise.

When somebody enters room 204, the acoustic room impulse response will change abruptly and adaptive filter 407 will no longer be in a converged state, and it will therefore provide a poor estimate $\hat{U}(m,k)$ of subband echo signal U(m,k). Also, as long as there is movement in the room, adaptive filter 407 attempts to track the continuously changing impulse response and may never achieve the same depth of convergence. Furthermore, movement in the room may cause Doppler shift, so that some of the energy in one frequency subband leaks over to a neighboring subband. The Doppler Effect can result in both a changed impulse response for a subband and also a mismatch between audio content in the loudspeaker subband output from analysis filter bank 404 and the microphone subband output from analysis filter bank 406. Both of these effects lead to residual echo and thus $$\left\| H_k(m) - \hat{H}_k(m) \right\|_{R_{X_k}}^2 \gg 0.$$

Moreover, if the person entering the room makes some sound in the ultrasonic frequency range, the power $\sigma_V^2(m,k) > 0$ of this sound will also contribute to a large error signal. The mean squared error (power) is a theoretical variable that is useful in theoretical analysis. In practice, power estimator 408 estimates the power of error signal Z(m,k). To do this, either a rectangular window of length L may be used as in:

$$P_Z(m,k) = \frac{1}{L} \sum_{l=0}^{L-1} |Z(m-l,k)|^2 \quad (6)$$

or an exponential recursive weighting may be used as in:

$$P_Z(m,k) = \alpha P_Z(m-1,k) + (1-\alpha)|Z(m,k)|^2 \quad (7)$$

where $\alpha$ is a forgetting factor in the range [0,1].

As mentioned above, detector 410 receives the power estimates of the error signal and performs people presence detection based on the power estimates. As indicated above, as soon as a person enters room 204, the power estimate of the error signal will change from a relatively small level to relatively large level. Thus, detection may be performed by comparing the power estimate of the error signal over time with a threshold that may be set, for example, to a few dBs above the steady-state power (e.g., the steady-state power is the power corresponding to when adaptive filter 407 is in a converged state, such that the threshold is indicative of the steady-state or converged state of the adaptive filter), or, if a running estimate of the variance of the power signal is also computed, to a fixed number of standard deviations above the steady-state power. Another embodiment estimates a statistical model of the power signal, and bases the decision on likelihood evaluations. It is desirable to design adaptive filter 407 for deep convergence instead of fast convergence. This is a well known tradeoff that can be controlled in stochastic gradient descent algorithms like normalized least mean squares (NLMS) with a step size and/or a regularization parameter.

With a single adaptive filter in one narrow ultrasonic frequency subband, e.g., k, as depicted in FIG. 4, the detection performance may be degraded due to a notch in the frequency response of loudspeaker 116, a notch in the frequency response of microphone 118, or an absorbent in room 204 within that particular frequency subband. Therefore, a more robust method may be achieved using an individual adaptive filter in each of multiple frequency subbands X(m,1)-X(m,N) (i.e., replicate adaptive filter 407) for each frequency subband, to produce an estimate of echo for each frequency subband. In that case, an error signal is generated corresponding to each of the frequency subbands from analysis filter bank 404, and an error signal for each frequency subband is produced based on the estimate of the echo for that frequency subband and a corresponding one of the transformed microphone signal frequency subbands Y(m,k) from analysis filter bank 406. Power estimator 408 computes a power estimate of the error signal for each of the frequency subbands and then combines them all into a total power estimate across the frequency subbands. For example, the total power estimate across the subbands for a given frame may be computed according to: $P_Z(m)=\alpha P_Z(m-1)+(1-\alpha)\Sigma_k |Z(m, k)|^2$, where $\Sigma_k$ indicates the sum over all subbands k that are in use. Alternatively, the total power estimate across the subbands may be computed according to: $P_Z(m)=\Sigma_k P_Z(m,k)$. In an embodiment, each power estimate may be a moving average of power estimates so that the total power estimate is a total of the moving average of power estimates.

Ultrasonic signal x(n) may either be an ultrasonic signal that is dedicated to the task of detecting people presence, or an existing ultrasonic signal, such as an ultrasonic pairing signal, as long as endpoint 104 is able to generate and transmit the ultrasonic signal while the endpoint is asleep, i.e., in standby. Best performance may be achieved when ultrasonic signal x(n) is stationary and when there is minimal autocorrelation of the non-zero lags of the subband transmitted loudspeaker signal. The correlation matrix $R_{X_k}$ of ultrasonic signal x(n) may be used to a certain degree to control the relative sensitivity of the people presence detection to the adaptive filter mismatch and the local sound from within the room.

Figure 5:
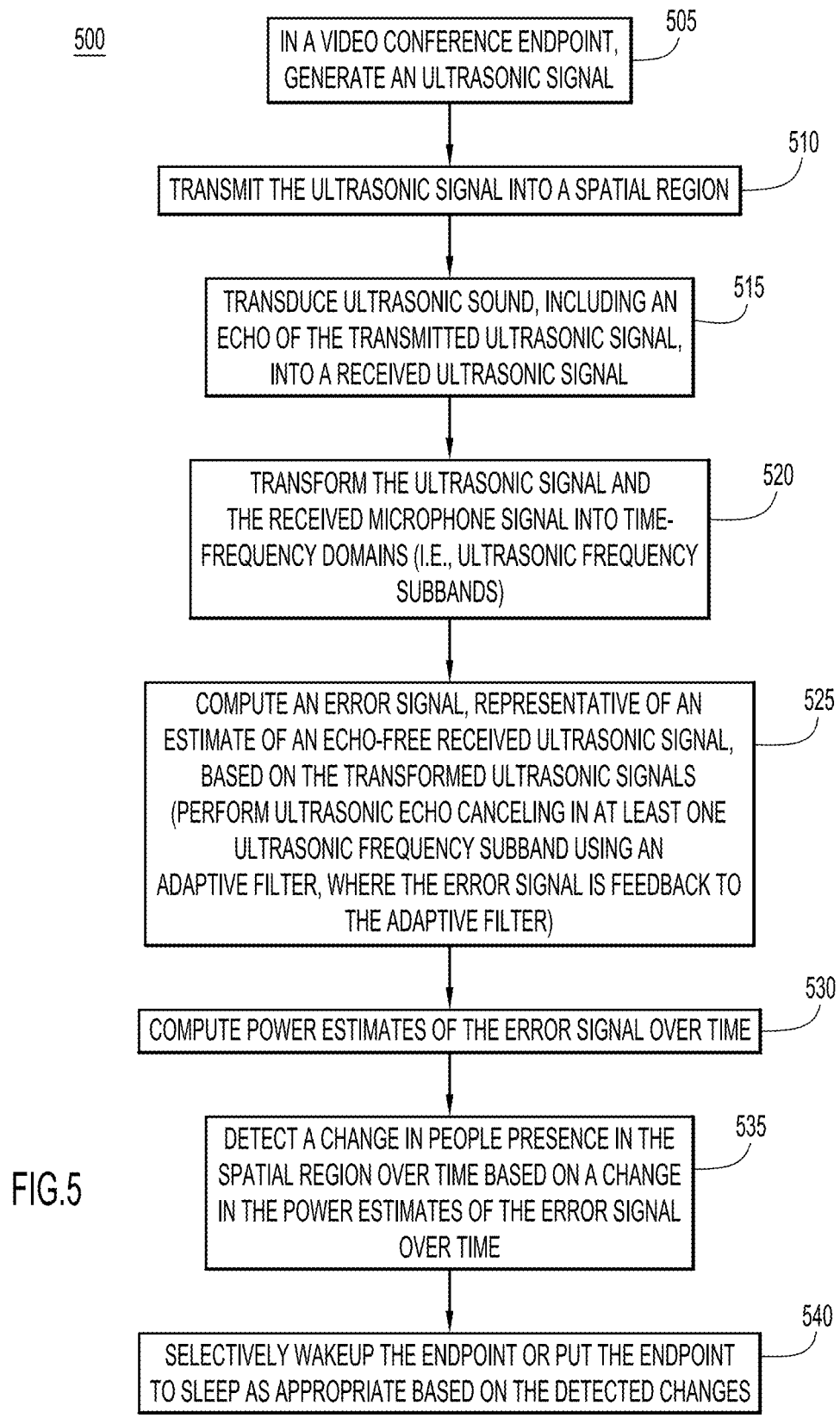
FIG. 5 is a flowchart of a method of detecting whether people are present in a room using the ultrasonic echo canceler of the video conference endpoint, and using the detections to selectively wakeup the endpoint or put the endpoint to sleep, according to an example embodiment.

With reference to FIG. 5, there is a flowchart of an example method 500 of detecting people presence in a spatial region (e.g., room 204) using ultrasonic echo canceler 400, and using the detections to selectively wakeup or put to sleep endpoint 104. Echo canceler 400 and controller 308 are fully operational while endpoint 104 is asleep and awake.

At 505, processor 308 generates an ultrasonic signal (e.g., x(n)).

At 510, loudspeaker 116 transmits the ultrasonic signal into a spatial region (e.g., room 204).

At 510, microphone 118 transduces sound, including ultrasonic sound that includes an echo of the transmitted ultrasonic signal, into a received ultrasonic signal (e.g., y(n)).

At 515, analysis filter banks 404 and 406 transform the ultrasonic signal (e.g., u(n)) and the received ultrasonic microphone signal into respective time-frequency domains each having respective ultrasonic frequency subbands.

At 520, differencer S computes an error signal, representative of an estimate of an echo-free received ultrasonic signal, based on the transformed ultrasonic signal and the transformed received ultrasonic signal. More specifically, difference 406 subtracts an estimate of the echo signal in the time-frequency domain from the transformed received ultrasonic signal to produce the error signal. This is a closed-loop ultrasonic echo canceling operation performed in at least one ultrasonic frequency subband using adaptive filter 407, which produces the estimate of the echo signal, where the error signal is fed back to the adaptive filter.

At 525, power estimator 408 computes power estimates of the error signal over time, e.g., the power estimator repetitively performs the power estimate computation as time progresses to produce a time sequence of power estimates. The power estimates may be a moving average of power estimates based on a current power estimate and one or more previous power estimates.

At 530, detector 410 detects people presence in the spatial region (e.g., room 204) over time based on the power estimates of the error signal over time. In an embodiment, detector 410 may detect a change in people presence in the spatial region over time based on a change in the power estimates (or a change in the moving average power estimates) of the error signal over time.

At 535, processor 344 issues commands to selectively wakeup endpoint 104 or put the endpoint to sleep as appropriate based on the detections at 530.

In another embodiment, the detection of people presence as described above may activate only those components of endpoint 104, e.g., video cameras 112, required by the endpoint to aid in additional processing by processor 344, such as detecting faces and motion in room 204 based on video captured by the activated/awakened cameras. In other words, the people presence detection triggers face and motion detection by endpoint 104. If faces and/or motion are detected subsequent to people presence being detected, only then does processor 344 issue commands to fully wakeup endpoint 104. Thus, the face and motion detection is a confirmation that people have entered room 204, which may avoid unnecessary wakeups due to false (initial) detections of people presence. Any known or hereafter developed technique to perform face and motion detection may be used in the confirmation operation.

Figure 6:
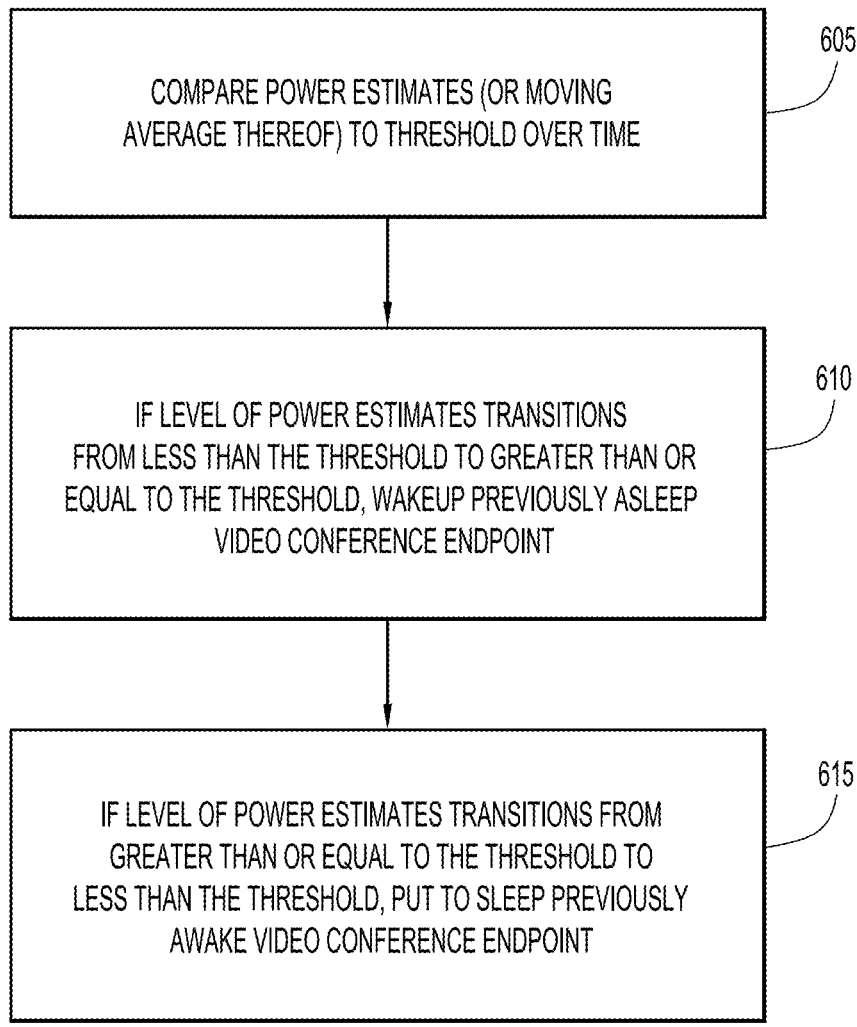
FIG. 6 is a series of operations expanding on detection and wakeup/sleep control operations from the method of FIG. 5, according to an example embodiment.

With reference to FIG. 6, there is a flowchart of operations 600, which expand on operations 530 and 535 of method 500.

To detect people presence (or a change in people presence), at 605 detector 410 compares power estimates (or a moving average of power estimates computed using a rectangular window as in equation (6) or an exponentially decaying window as in equation (7)) to a power estimate (or moving average) threshold indicative of people presence over time. One way to detect people presence is to set a detection threshold a few dBs (e.g., 2-5 dBs) above a steady-state power of the power estimates. The steady-state power estimates occurs or corresponds to when adaptive filter 407 is in a steady-state, i.e., a converged state. Another way would be to compute the mean and variance over time of the power estimates in steady-state, and to set the threshold automatically as a few standard deviations (e.g., 2-5) above the mean (steady-state power). These methods for detection apply to both the case when a single subband is used, and for the case when multiple subbands are used.

At 610, if the power estimates transition from a first level that is less than the power estimate threshold to a second level that is greater than or equal to the power estimate threshold, processor 308 issues commands to wakeup endpoint 104 if the endpoint was previously asleep.

At 615, if the power estimates transition from a first level that is greater than or equal to the threshold to a second level that is less than the threshold, processor 308 issues commands to put endpoint 104 to sleep if the endpoint was previously awake.

In operations 610 and 615, controller 308 may respectively issue wakeup and sleep commands to cameras 112, display 114, and/or portions of the controller that may be selectively awoken and put to sleep responsive to the commands. Also, timers may be used in operations 610 and 615 to ensure a certain level of hysteresis to dampen frequent switching between awake and sleep states of endpoint 104. For example, operation 610 may require that the power estimate level remain above the threshold for a first predetermined time (e.g., on the order of several seconds, such as 3 or more seconds) measured from the time that the level reaches the threshold before issuing a command to wakeup endpoint 104, and operation 615 may require that the power estimate level remain below the threshold for a second predetermined time (e.g., also on the order of several seconds) measured from the time the level falls below the threshold before issuing a command to put endpoint 104 to sleep.

In summary, embodiments presented herein perform the following operations: play/transmit a stationary ultrasonic signal from a loudspeaker; convert sound picked-up by a microphone (i.e., a microphone signal) and the ultrasonic signal from the loudspeaker into the time-frequency domain; estimate an echo-free near-end signal (i.e., error signal) at the microphone with an ultrasonic frequency sub-band adaptive filter; (this is an ultrasonic echo canceling operation); compute an estimate on the power of the error signal (or a running estimate thereof); detect people presence (or a change in people presence) from the estimated power (or changes/variations) in the estimated power.

In one embodiment, detections may be used to wakeup a camera that was previously asleep, and also cause additional processing to occur, such as detection of faces and motion using video captured by the awakened camera.

In summary, in one form, a method is provided comprising: transmitting an ultrasonic signal into a spatial region; transducing ultrasonic sound, including an echo of the transmitted ultrasonic signal, received from the spatial region at a microphone into a received ultrasonic signal; transforming the ultrasonic signal and the received ultrasonic signal into respective time-frequency domains that cover respective ultrasound frequency ranges; computing an error signal, representative of an estimate of an echo-free received ultrasonic signal, based on the transformed ultrasonic signal and the transformed received ultrasonic signal; computing power estimates of the error signal over time; and detecting a change in people presence in the spatial region over time based on a change in the power estimates of the error signal over time.

In another form, an apparatus is provided comprising: a loudspeaker configured to transmit an ultrasonic signal into a spatial region; a microphone configured to transduce ultrasonic sound, including an echo of the transmitted ultrasonic signal, received from the spatial region into a received ultrasonic signal; a processor coupled to the loudspeaker and the microphone and configured to: transform the ultrasonic signal and the received ultrasonic signal into respective time-frequency domains; compute an error signal, representative of an estimate of an echo-free received ultrasonic signal, based on the transformed ultrasound signal and the transformed received ultrasonic signals; compute power estimates of the error signal over time; and detect a change in people presence in the spatial region over time based on a change in the power estimates of the error signal over time.

In yet another form, a (non-transitory) processor readable medium is provided. The medium stores instructions that, when executed by a processor, cause the processor to: cause a loudspeaker to transmit an ultrasonic signal into a spatial region; access a received ultrasonic signal representative of transduced ultrasonic sound, including an echo of the transmitted ultrasonic signal, received from the spatial region at a microphone; transform the ultrasonic signal and the received ultrasonic signal into respective time-frequency domains that cover respective ultrasound frequency ranges; compute an error signal, representative of an estimate of an echo-free received ultrasonic signal, based on the transformed ultrasonic signal and the transformed received ultrasonic signal; compute power estimates of the error signal over time; and detect a change in people presence in the spatial region over time based on a change in the power estimates of the error signal over time.

The above description is intended by way of example only. Various modifications and structural changes may be made therein without departing from the scope of the concepts described herein and within the scope and range of equivalents of the claims.

What is claimed is:

1. A method comprising:
   transmitting an ultrasonic signal into a spatial region;
   transducing ultrasonic sound, including an echo of the transmitted ultrasonic signal, received from the spatial region at a microphone into a received ultrasonic signal;
   transforming the ultrasonic signal and the received ultrasonic signal into respective time-frequency domains that cover respective ultrasound frequency ranges;
   computing an error signal, representative of an estimate of an echo-free received ultrasonic signal, based on the transformed ultrasonic signal and the transformed received ultrasonic signal;
   computing power estimates of the error signal over time; and
   detecting a change in people presence in the spatial region over time based on a change in the power estimates of the error signal over time.

2. The method of claim 1, wherein the computing an error signal includes:
   adaptively filtering at least one ultrasonic frequency subband of the transformed ultrasonic signal based on a set of adaptive filter coefficients adjusted responsive to the error signal to produce an estimate of the echo in the frequency subband;
   differencing the estimated echo and the transformed received ultrasonic signal in at least one of the frequency subbands thereof to produce the error signal; and
   feeding-back the error signal to the adaptively filtering operation.

3. The method of claim 2, wherein:
   the adaptively filtering includes adaptively filtering multiple ultrasonic frequency subbands of the transformed ultrasonic signal individually to produce a respective estimate of the echo for each frequency subband;
   the differencing includes differencing each echo estimate and a corresponding one of multiple frequency subbands of the transformed received ultrasonic signal to produce an error signal for each frequency subband;
   the computing power estimates includes repetitively computing a total power estimate based on the error signals across the frequency subbands; and
   the detecting includes detecting a change in people presence over time based on a change in the total power estimates computed across the frequency subbands over time.

4. The method of claim 1, wherein:
   the computing power estimates includes computing a moving average of power estimates over time, wherein the moving average is based on a current power estimate of the error signal and one or more previous power estimates of the error signal; and
   the detecting includes detecting a change in people presence over time based on a change in the moving average over time.

5. The method of claim 4, wherein the detecting includes:
   comparing the moving average of power estimates to a moving average power threshold indicative of a change in people presence in the spatial region; and
   if the comparing indicates that the moving average of power estimates has changed from a first level below the threshold to a second level equal to or greater than the threshold, then declaring that people are present in the spatial region.

6. The method of claim 5, further comprising:
if it is declared that people are present in the spatial region, issuing one or more commands to wakeup a video conference endpoint that was previously asleep.

7. The method of claim 6, further comprising:
if it is declared that people are present in the spatial region, prior to issuing the one or more commands to wakeup the video conference endpoint, triggering the endpoint to perform face and motion detection in the spatial region; and
issuing the one or more commands to wakeup the endpoint only if the triggered face and motion detection confirms the presence of people in the spatial region.

8. The method of claim 1, wherein the detecting includes:
comparing the power estimates to a power estimate threshold indicative of a change in people presence in the spatial region; and
if the comparing indicates that the power estimates have changed from a first level below the threshold to a second level equal to or greater than the threshold, then declaring people are present in the spatial region.

9. The method of claim 8, further comprising:
if it is declared that people are present in the spatial region, issuing one or more commands to wakeup a video conference endpoint that was previously asleep.

10. The method of claim 1, further comprising:
if the detecting indicates that people are present in the spatial region, issuing a command to wakeup a video camera that was previously asleep so that the video camera is able to capture video of at least a portion of the spatial region.

11. An apparatus comprising:
a loudspeaker configured to transmit an ultrasonic signal into a spatial region;
a microphone configured to transduce ultrasonic sound, including an echo of the transmitted ultrasonic signal, received from the spatial region into a received ultrasonic signal;
a processor coupled to the loudspeaker and the microphone and configured to:
transform the ultrasonic signal and the received ultrasonic signal into respective time-frequency domains;
compute an error signal, representative of an estimate of an echo-free received ultrasonic signal, based on the transformed ultrasound signal and the transformed received ultrasonic signals;
compute power estimates of the error signal over time; and
detect a change in people presence in the spatial region over time based on a change in the power estimates of the error signal over time.

12. The apparatus of claim 11, wherein, to compute the error signal, the processor is configured to:
adaptively filter the transformed ultrasonic signal based on a set of adaptive filter tap weights and the error signal to produce an estimate of the echo;
difference the estimated echo and the transformed received ultrasonic signal to produce the error signal; and
feed-back the error signal to the adaptively filter operation.

13. The apparatus of claim 12, wherein:
the processor is configured to adaptively filter by adaptively filtering multiple ultrasonic frequency subbands of the transformed ultrasonic signal individually to produce a respective estimate of the echo for each frequency subband;
the processor is configured to difference by differencing each echo estimate and a corresponding one of multiple frequency subbands of the transformed received ultrasonic signal to produce an error signal for each frequency subband;
the processor is configured to compute power estimates by:
repetitively computing a total power estimate based on the error signals across the frequency subbands; and
the processor is configured to detect by detecting a change in people presence over time based on a change in the total power estimates computed across the frequency subbands over time.

14. The apparatus of claim 11, wherein:
to compute power estimates, the processor is configured to compute a moving average of power estimates over time, wherein the moving average is based on a current power estimate of the error signal and one or more previous power estimates of the error signal; and
to detect, the processor is configured to detect a change in people presence over time based on a change in the moving average over time.

15. The apparatus of claim 11, wherein the processor is configured to detect by:
comparing the power estimates to a power estimate threshold indicative of a change of people presence in the spatial region;
if the comparing indicates that the power estimates have changed from a first level below the threshold to a second level equal to or greater than the threshold, then declaring people are present in the spatial region.

16. The apparatus of claim 11, further comprising a video camera coupled to the processor, wherein the processor is further configured to:
if the detect operation indicates people are present in the spatial region, issue a wakeup command to the video camera to wakeup if the video camera was previously asleep so that the video camera is able to capture video of at least a portion of the spatial region.

17. A non-transitory processor readable medium storing instructions that, when executed by a processor, cause the processor to:
cause a loudspeaker to transmit an ultrasonic signal into a spatial region;
access a received ultrasonic signal representative of transduced ultrasonic sound, including an echo of the transmitted ultrasonic signal, received from the spatial region at a microphone;
transform the ultrasonic signal and the received ultrasonic signal into respective time-frequency domains that cover respective ultrasound frequency ranges;
compute an error signal, representative of an estimate of an echo-free received ultrasonic signal, based on the transformed ultrasonic signal and the transformed received ultrasonic signal;
compute power estimates of the error signal over time; and
detect a change in people presence in the spatial region over time based on a change in the power estimates of the error signal over time.

18. The processor readable medium of claim 17, wherein the instructions to cause the processor to compute the error signal include instructions to cause the processor to:
adaptively filter at least one ultrasonic frequency subband of the transformed ultrasonic signal based on a set of adaptive filter coefficients adjusted responsive to the error signal to produce an estimate of the echo in the frequency subband;
difference the estimated echo and the transformed received ultrasonic signal in at least one of the frequency subbands thereof to produce the error signal; and feed-back the error signal to the adaptively filtering operation.

19. The processor readable medium of claim 17, wherein:
the instructions to cause the processor to compute power estimates include instructions to cause the processor to compute a moving average of power estimates over time, wherein the moving average is based on a current power estimate of the error signal and one or more previous power estimates of the error signal; and
the instructions to cause the processor to detect include instructions to cause the processor to detect a change in people presence over time based on a change in the moving average over time.

20. The processor readable medium of claim 19, wherein the instructions to cause the processor to detect include instructions to cause the processor to:
compare the moving average of power estimates to a moving average threshold indicative of people presence in the spatial region; and
if the comparing indicates that the moving average has changed from a first level below the threshold to a second level equal to or greater than the threshold, then declare people are present in the spatial region.

* * * * *